(12) United States Patent
Schweizer et al.

(10) Patent No.: US 7,611,163 B2
(45) Date of Patent: Nov. 3, 2009

(54) INTERIOR TRIM PART FOR COVERING AN AIRBAG

(75) Inventors: Gordon Schweizer, Rheinzabern (DE); Lars Melde, Braunschweig (DE); Wolfram Bühler, Speyer (DE); Thomas Jahn, Forst (DE); Jürgen Zimmerle, Rothenbach (DE); Klaus Bamberg, Hagenbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 521 days.

(21) Appl. No.: 10/573,150

(22) PCT Filed: Sep. 23, 2004

(86) PCT No.: PCT/EP2004/010846

§ 371 (c)(1),
(2), (4) Date: Mar. 22, 2006

(87) PCT Pub. No.: WO2005/030537

PCT Pub. Date: Apr. 7, 2005

(65) Prior Publication Data

US 2007/0052210 A1 Mar. 8, 2007

(30) Foreign Application Priority Data

Sep. 24, 2003 (DE) ................. 103 45 026

(51) Int. Cl.
*B60R 21/215* (2006.01)
*B60R 21/205* (2006.01)

(52) U.S. Cl. .................. 280/728.3; 280/732

(58) Field of Classification Search .......... 280/728.3, 280/732, 731
See application file for complete search history.

(56) References Cited

U.S. PATENT DOCUMENTS

| | | | | |
|---|---|---|---|---|
| 4,852,907 A | * | 8/1989 | Shiraki et al. | 280/731 |
| 4,911,471 A | * | 3/1990 | Hirabayashi | 280/732 |
| 5,080,393 A | * | 1/1992 | Dixon et al. | 280/732 |
| 5,121,942 A | * | 6/1992 | Warnick et al. | 280/732 |
| 5,322,324 A | | 6/1994 | Hansen et al. | |
| 5,527,574 A | * | 6/1996 | Iannazzi et al. | 428/43 |

(Continued)

FOREIGN PATENT DOCUMENTS

DE 39 18 281 2/1994

(Continued)

*Primary Examiner*—Paul N. Dickson
*Assistant Examiner*—George D. Spisich
(74) *Attorney, Agent, or Firm*—Fay Kaplun & Marcin, LLP

(57) ABSTRACT

Described is an interior trim part for covering an airbag, which may include a two-dimensional carrier, a surface decor and a foamed intermediate layer. A through-opening for the airbag is recessed in the carrier, and an inlay covering the through-opening is applied into the intermediate layer, such that the inlay projects beyond an edge of the through-opening on one side and there, in an overlapping region of the inlay and of the carrier, serves as a hinge for an airbag flap formed by the surface decor and the intermediate layer with the inlay. Furthermore, with a folding open of the airbag flap, an energy amount which is dependent on the intensity of an opening impact of the airbag, may be absorbed by way of a release of the intermediate layer with the inlay from the carrier, away from the edge in the overlapping region.

15 Claims, 2 Drawing Sheets

U.S. PATENT DOCUMENTS

| | | | | |
|---|---|---|---|---|
| 5,590,901 A | * | 1/1997 | MacGregor | 280/728.3 |
| 5,590,903 A | * | 1/1997 | Phillion et al. | 280/728.3 |
| 5,863,062 A | * | 1/1999 | Harada et al. | 280/728.3 |
| 6,070,901 A | | 6/2000 | Hazell et al. | |
| 6,123,356 A | * | 9/2000 | Gray et al. | 280/728.3 |
| 6,158,763 A | * | 12/2000 | Dominique et al. | 280/728.2 |
| 6,210,614 B1 | * | 4/2001 | Gardner et al. | 264/46.5 |
| 6,447,004 B1 | * | 9/2002 | Kawakubo et al. | 280/728.3 |
| 6,612,608 B2 | * | 9/2003 | Schmidt et al. | 280/728.3 |
| 6,651,998 B1 | * | 11/2003 | Mayer et al. | 280/728.3 |
| 6,753,057 B1 | * | 6/2004 | Gardner, Jr. | 428/43 |
| 2003/0132621 A1 | * | 7/2003 | Arieth et al. | 280/732 |
| 2006/0267313 A1 | * | 11/2006 | Yasuda et al. | 280/728.3 |

FOREIGN PATENT DOCUMENTS

| | | |
|---|---|---|
| DE | 196 40 434 | 4/1997 |
| DE | 297 08 446 | 10/1997 |
| DE | 101 35 224 | 2/2003 |

* cited by examiner

INTERIOR TRIM PART FOR COVERING AN AIRBAG

FIELD OF THE INVENTION

The present invention relates to an interior trim part for covering an airbag, thus a gas bag of a retaining system for vehicle occupants. The present invention furthermore relates to a corresponding airbag arrangement and to a method for manufacturing such an interior trim part.

BACKGROUND OF THE INVENTION

A three-layered construction of such interior trim parts with a two-dimensional carrier, a foamed intermediate layer and a surface decor which may e.g. consist of leather, a fabric or a plastic skin, is common, and permits a simple manufacture of the interior trim part, which at the same time may be provided with pleasant optical as well as haptic properties. It is also known according to the state of the art, to provide the carrier with a recess as a through-opening for the airbag, so that the interior trim part has one layer less there. On account of this, the interior trim part obtains a further structure in a region provided for a passage of the airbag, and this structure may be penetrated by the opening airbag without a complicated flap design with hinge pins and hinge bearings subjected to high loads, becoming necessary. By way of this, one already achieves a significant reduction in the flight of particles on account of a destruction of hard components caused by the opening airbag, which is dangerous for the occupants of the vehicle. In order, despite the recess in the carrier, to give the interior trim part an adequately high shape-stability in the corresponding region, it is further known to apply an inlay covering the recess, into the intermediate layer there. This inlay, for which for example a cushion of cut foam has been suggested in the document WO 03/033313 A1, may thereby consist of a material which is infinitely softer within large limits compared to the carrier, and which is suitable for at least partly filling out a region forming the intermediate layer, and for ensuring a predefined surface shape of the interior trim part in the region of the through-opening.

The embodiments of the interior trim parts of the known type and known according to the state of the art however, entail disadvantages which are particularly due to the fact that depending on the scenario of an accident or the actuation of the airbag, the interior trim part may be hit by the airbag with an active energy which is very different from case to case. This is obviously the case with two-stage or multi-stage airbag systems with which, with slight accidents, an actuation of only one stage or not all stages is provided, or a time delay is provided until the actuation of a further stage, depending on the scenario. Very large differences between different possible opening active energies may be created, but also due to a temperature dependence which is considerable under circumstances, of properties of a pyrotechnic filling device for example. But the interior trim part in the region of the through-opening is nevertheless to be designed sufficiently weak in order to ensure a secure breaking-open due to the opening airbag, also with an opening impact with the smallest possible active energy. With embodiments according to the state of the art, the result of this is the fact that with an actuation of the airbag, only a very limited energy amount which is largely independent of the scenario, may be absorbed by the breaking-open of the interior trim part. With scenarios with an airbag opening with a larger active energy, a significantly lower energy amount is absorbed by the tearing-open and folding open of the covering on account of this, than is desirable regarding the active energy of the opening impact. This in turn has the result that a material destruction of the interior trim part and of adjacent components caused by excess energy, and the flight of particles endangering vehicle occupants which this entails, may hardly be prevented or only at great costs, such as for example by way of a costly reinforcement of the interior trim part in regions which surround the through-opening.

SUMMARY OF THE INVENTION

The present invention is thus based on the task of developing an interior trim part of the known type and a corresponding airbag arrangement, which combine a simple and inexpensively manufacturable construction, with properties, which, with an actuation of the airbag, reliably prevent an uncontrolled bursting open, as well as a material destruction which entails the formation of splinters, the flight of particles and an occurrence of sharp edges, and specifically for an as wide as possible range of possible energy inputs due to the airbag opening into the interior trim part. It is further the object of the invention, to suggest an as inexpensive as possible manufacturing method for such an interior trim part.

By way of the fact that the inlay projects beyond an edge of the through-opening on one side, and there, in an overlapping region of the inlay and the carrier, forms a hinge for an airbag flap formed by the surface decor and the intermediate layer with the inlay, wherein an energy amount dependent on the intensity of the opening impact of the airbag may be absorbed by way of this when the airbag flap is swung open, by way of the fact that the intermediate layer with the inlay on swinging-open is released from the carrier in the overlapping region away from the edge, one achieves a very secure opening of the cover for differently great opening impacts, and it is also ensured that no energy inputs into the interior trim part, which are too large, lead to uncontrolled damage and dangerous phenomena such as the flight of particles which this entails. Thus without any problem, one may thus realize a design which on the one hand is adequately weak in order to ensure a secure and adequately wide opening of the airbag flap also with a very weak opening impact e.g. due to temperature or on account of the absence of a second airbag stage, but which on the other hand, with a very large opening impact, for example with an actuation of all stages, causes no uncontrolled and dangerous destruction due to the opening airbag.

This advantage, as previously, is realised with a simple construction, which in particular makes do without the design of the airbag flap as a rigid component, and a complicated hinge with greatly loaded moving parts. Indeed, the inlay serves as a hinge which is adequately soft for this and which on opening, is bent up with the intermediate layer containing it, and with the surface decor. Prior to this, the surface decor and the intermediate layer tear open on a side of the through-opening lying opposite the hinge, wherein the inlay and/or the intermediate layer may be designed weakened along the edge of the through-opening there, and laterally of the airbag flap, which favors a precise tearing-open. The inlay may alternatively be dimensioned such that it ends exactly where the interior trim part is to tear open, thus with the exception of the side at which the inlay forms the hinge, at the edge of the through-opening.

An amount of energy which is introduced into the interior trim part by the opening impact, which remains or is added after the tearing-open, is then absorbed away by the release of the intermediate layer with the inlay from the carrier in the overlapping region away from the edge of the through-opening. Thereby, the inlay functioning as a hinge there, with the intermediate layer is released to a greater or lesser extent depending on the amount of this energy, as a rule up to a line which runs roughly parallel to the edge of the through-opening, and which runs further distanced to this edge, the larger is the active energy of the opening impact and thus the energy input into the interior trim part. The hinge formed by the inlay with a comparatively great opening impact thus travels away from the edge of the through-opening. The possibility of being able to absorb very different energy amounts by way of this, is lastly advantageous, since the interior trim part may have a stability and brittleness which depend on the temperature. A harmful flight of particles with an actuation of the airbag is also effectively avoided with an interior trim part according to the invention by way of the fact that on the one hand, the force tearing open the airbag flap acts on the surface decor in a somewhat large-surfaced manner by way of the inlay, and on the other hand by way of the fact that fractures which under certain circumstances arise despite this, remain clinging to the inlay, preferably a spacer fabric, and thus the creation of broken pieces is avoided.

With a preferred embodiment of the invention, the preferably fibrous or porous inlay is at least partly, but better still completely penetrated by a foam forming the intermediate layer. A positive-fit connection of the foam with the inlay results by way of this, which favors a clinging of particles and broken pieces in the inlay arising from the actuation of an airbag. Furthermore, by way of this, one may realize a connection of the inlay to the carrier in a very simple manner, by which means the energy consumption is ensured when the inlay is released from the carrier. Thereby, it is not important whether remains of the intermediate layer remain clinging to the carrier.

In order to ensure a good impregnation of the inlay with the foam of the intermediate layer, a manufacture of the inlay from a spacer fabric, preferably a polyamide fabric or another polymer fabric is suitable, which on the one hand is adequately soft, but on the other hand may provide the interior trim part with the necessary shape stability in the region of the through-opening. By way of this, one achieves a good force transmission from the airbag flap onto the hinge.

In order at all events to prevent a complete tearing-off of the airbag flap, the inlay at one end of the overlapping region lying opposite the edge of the through-opening, may itself be fastened on the carrier, so that a connection between the inlay and the carrier is not merely provided by the foam of the intermediate layer. For this, the inlay is riveted or screwed on the carrier in a suitable manner.

With advantageous designs of the invention, a further layer or also several further layers may be applied behind the inlay. Such a layer which is arranged in the carrier between the inlay and the carrier or the through-opening may serve for sealing the through-opening in order to prevent an escape of foam there, when rear-foaming the surface decor, as well as provide the airbag flap with a high tensile loading capacity. The airbag flap is particularly subjected to a high tensile loading until the tearing-open due to the opening airbag. A fabric layer arranged behind the inlay is particularly suitable, in order to prevent an uncontrolled tearing of the airbag flap. In contrast, a film or an adequately compact non-woven is suitable for sealing the through-opening. Such an additional layer (sealing- and/or reinforcement layer) may be sewn or bonded to the inlay, which simplifies a correct positioning of this layer behind the inlay.

In order to ensure the described effect of a variable energy input into the interior trim part by way of the opening airbag in a useful scope, the overlapping region transverse to the edge of the through-opening should have an extension of at least 4 cm or better still at least 7 cm. An overlapping by more that 20 cm is not necessary and may be avoided in the interest of a rear-foaming which is not made unnecessarily difficult.

One arrangement of an airbag behind an interior trim part of the described type is particularly advantageous for front seat passenger airbags which usually have a particularly large volume and with which as a rule, due to this, one has to reckon with particularly strong opening impacts. The described advantages come particularly to the forefront with an embodiment of the corresponding interior trim part according to the invention, which then becomes an instrument panel.

An inexpensive manufacture of an interior trim part according to the invention, which has the described advantages and pleasant haptic properties, results with the use of polyurethane foam for the intermediate layer, wherein the carrier, which as a whole is to provide the interior trim part with an adequate stability, is manufactured of polypropylene or of a plastic containing polypropylene and may be designed for example as an injection molded part.

In order to ensure an adequate stability also in the region of the through-opening, which is particularly loaded given an actuation of the airbag, the carrier, there, may be reinforced by way of a plastic frame and/or a metal frame. Such a frame may surround the through-opening and be welded, cast, screwed or riveted on behind the carrier, or between the carrier and the intermediate layer. Such a frame is also suitable for fastening an airbag module arranged behind the interior trim part.

With a particularly simple method for manufacturing an interior trim part of the type suggested here, the inlay with a sealing layer arranged behind it and possibly with an additional fabric layer may be introduced into a cavity between the surface decor applied into a rear foaming tool, and the carrier, such that the through-opening is covered, whereupon the mentioned cavity may be filled by way of a rear-foaming of the surface decor. The sealing layer, as also a reinforcement layer (e.g. fabric layer) which under certain circumstances may be additionally provided, may be fastened on the inlay, and be arranged together with this on the carrier, or also be fastened on the carrier before introducing the inlay, for example by way of bonding, such that the sealing layer finally comes to lie between the carrier and the inlay.

In order to achieve a connection of the foam of the intermediate layer with the carrier and by way of this to achieve a connection of the inlay to the carrier, the sealing layer or a further possibly present layer which is applied behind the inlay, may be provided with recesses in the overlapping region. A weakening of the intermediate layer and/or of the inlay which may be required under certain circumstances, may be carried out after the rear-foaming, for example by way of cutting in from behind. This additional working step may however be avoided if a suitable dimensioning of the inlay ensures a tearing open of the airbag flap at the edge of the through-opening without any weakening, or if the inlay is introduced in the cavity between the surface decor and the carrier already with a suitable weakening.

BRIEF DESCRIPTION OF THE DRAWINGS

One embodiment of the invention is explained in the following by way of the FIGS. 1 to 3. There are shown in.

DETAILED DESCRIPTION

Figure 1:
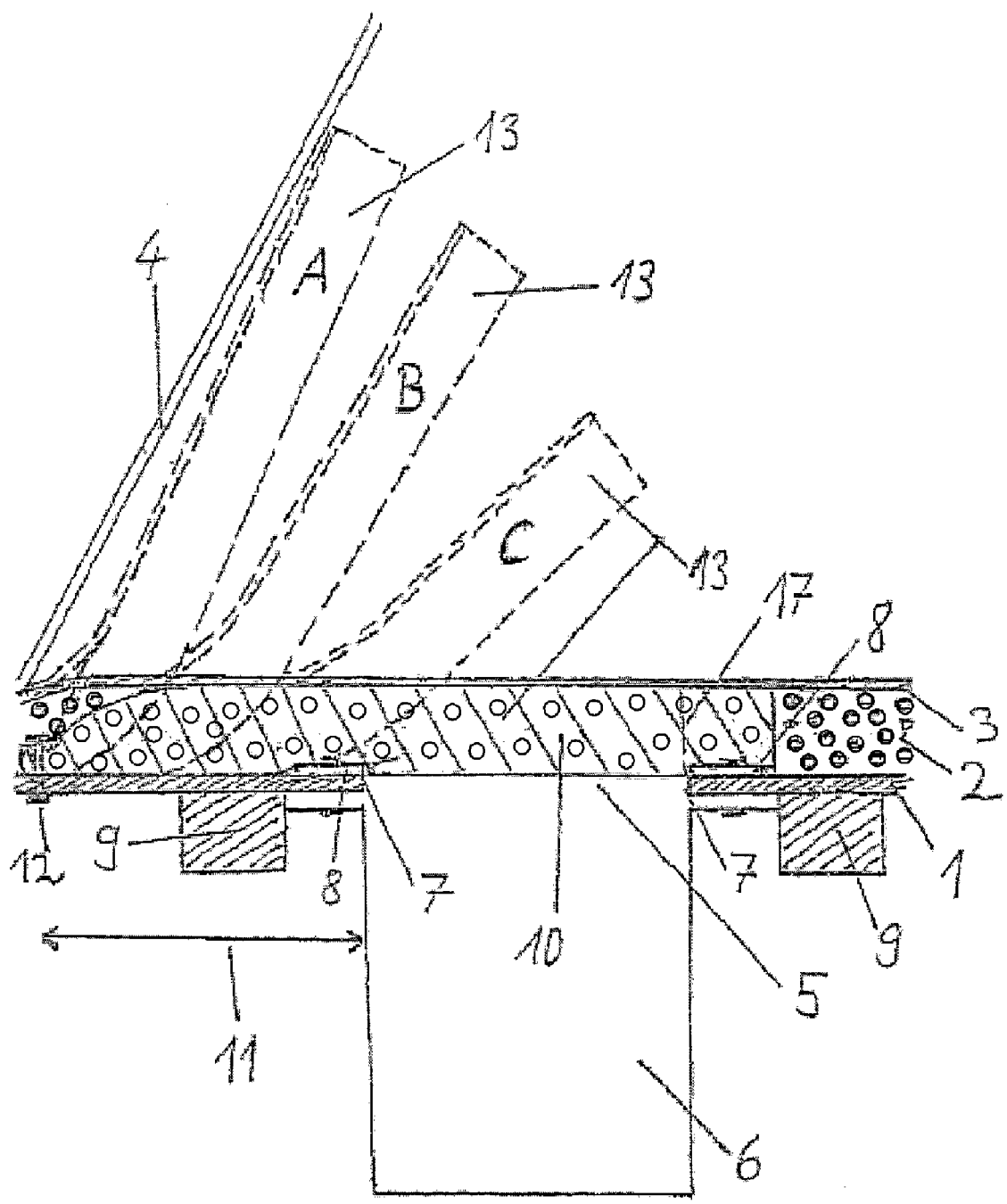
FIG. 1 shows a cross section through an interior trim part according to an exemplary embodiment of the present invention, which forms a part of an instrument panel and behind which an airbag module is arranged.

The part of an instrument panel shown in FIG. 1 comprises a two-dimensional carrier 1 of polypropylene, a surface decor 3 formed of a cast skin, and an intermediate layer 2, wherein the intermediate layer 2 consists essentially of a polyurethane foam. In the figure, one may also recognize a windscreen 4 of a motor vehicle, into which the instrument panel is installed. A through-opening 5 for a front seat passenger airbag is recessed in the carrier 1. An airbag module 6 is arranged behind the through-opening 5 and is screwed onto the carrier at an edge 7 of the through-opening 5, for which inlay sheet metal parts 8 are applied onto the carrier 1. The carrier 1 is furthermore reinforced by a plastic frame 9 which surrounds the through-opening 5 and which is melted onto the carrier 1 from below. An inlay of a polyamide fabric which is a component of the intermediate layer 2 and is impregnated by the polyurethane foam forming the intermediate layer 2 is applied into the intermediate layer 2. This inlay 10 covers the through-opening and, there, provides the instrument panel with a certain shape stability by way of this.

On the left side of FIG. 1, thus in the travel direction of the vehicles, the inlay 10 projects beyond the edge 7 of the through-opening 5 and, there, transverse to the edge 7, has an overlap 11 with the carrier 1 of about 7 cm. At a distance to the edge 7, which corresponds to the overlap 11, the inlay 10 or one end of the inlay 10 lying in the travel direction of the vehicle, is fastened on the carrier 1 by way of a rivet connection 12. What may not be recognized in the FIG. 1 is a fabric layer and a film which are applied behind the inlay, in order to provide an airbag flap 12 formed by the surface decor 3 and the intermediate layer 2 with the inlay 10 with an increased tensile loading capability and to ensure a sealing of the through-opening 5. In order to simplify a tearing open of the surface decor 3 and the intermediate layer 2 by the opening front seat passenger airbag, and by way of this, to permit an opening of the airbag flap 13 created by the opening of the airbag, the cast skin forming the surface decor 3, the foam of the intermediate layer 2 and the inlay 10 along the edge 7 of the through opening 5 is weakened with the exception of that side which lies to the left in FIG. 1, on which the inlay 10 has the overlap 11 with the carrier 1. A weakening 17 at the same time is realized by a perforation of the inlay 10 and of the foam of the intermediate layer 2, as well as a by way of a reduced thickness of the surface decor 3.

The inlay, where the inlay 10 projects beyond the edge 7 of the through-opening 5 and has the overlap 11 with the carrier 1, serves as a hinge for the airbag flap 13, wherein the intermediate layer 2 with the inlay 10 here, releases from the carrier away from the edge 7 when the airbag flap 13 opens under the effect of the airbag. At the same time, the intermediate layer 2 with the inlay 10 releases up to a location, which lies further from the edge 7, the greater the opening impact of the airbag. By way of example, the opened airbag flap 13 is shown here for three possible scenarios A, B and C, wherein scenario A corresponds to a violent, scenario B to a medium-intensity and scenario C to a comparatively weak, opening impact. Depending on the intensity of the opening impact, which may be e.g. temperature-dependent or, with a multi-stage airbag, dependent on how many stages are triggered, the energy amount according to a variable magnitude may be absorbed by the opening airbag flap 13 by way of this, by which means uncontrolled damage may be avoided given a violent actuation of the airbag, but simultaneously an adequately weak design is possible for a relatively slight opening impact.

Figure 2:
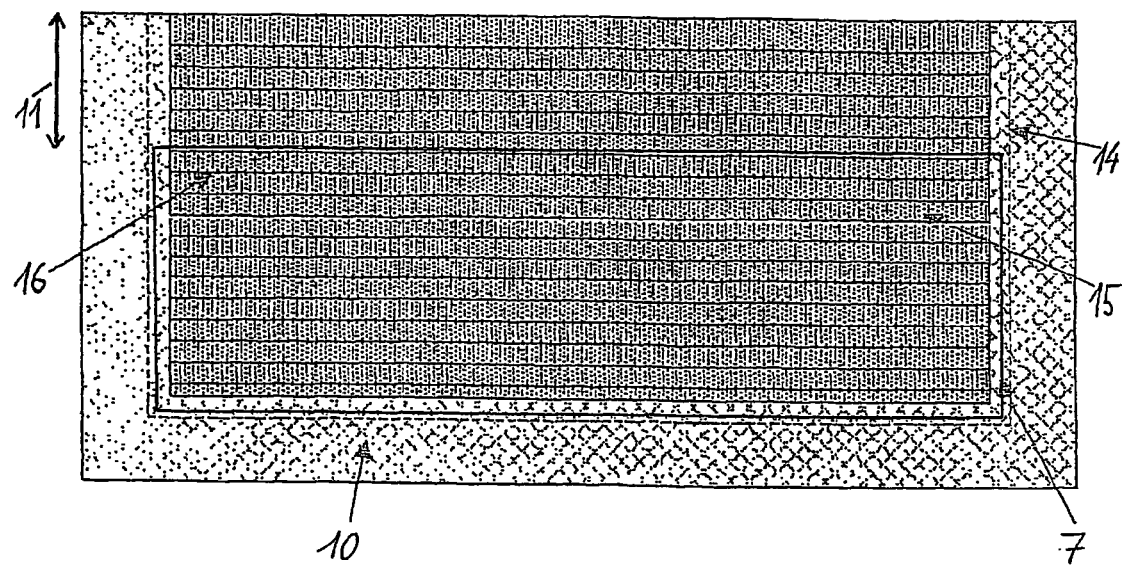
FIG. 2 shows a plan view of an inlay, which is applied into the interior trim part of FIG. 1.

A plan view of the inlay 10 of the same embodiment example is shown in FIG. 2. The inlay 10 here consists of the product Enkamat 7210® of the manufacturer Colbond Geosynthetics GmbH. The edge 7 of the through-opening of the carrier 1 which is not shown here, is drawn as an unbroken line, and a further, dashed line 14 indicates where the inlay 10 is perforated and weakened by way of this. A fabric layer 15 is also to be seen, which on the rear side is sewn onto the inlay 10 with seams 16. The overlap 11 is also drawn in again.

Figure 3:
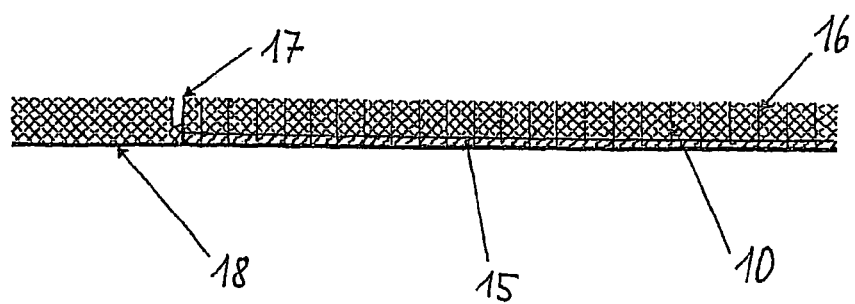
FIG. 3 shows a cross section through this inlay.

FIG. 3 finally shows a cross section through the same inlay 10. The fabric layer 15 which is fastened behind the inlay 10 by the seam 16, and the weakening 17 which runs along the line 14 from FIG. 2, are also shown. Finally, a sealing layer 18 applied behind the inlay 10 and the fabric layer 15 is to be recognized, which here is designed as a film but which may also be replaced by a sealing non-woven. This sealing layer 18 is provided with recesses in the region of the overlap 11 which is not shown here, in order to permit a connection of the inlay 10 to the carrier 1 which is likewise not shown, by way of the polyurethane foam of the intermediate layer 2.

Embodiments of the invention which are different from the embodiment example explained by way of FIGS. 1 to 3 are also conceivable, in particular those with which features of the optional features presented here are only selected realized in a certain combination. The invention thus very generally suggests an interior trim part for covering an airbag, which comprises a two-dimensional carrier, a surface decor and a foamed intermediate layer, wherein a through-opening for the airbag is recessed in the carrier, and an inlay covering the through-opening is applied into the intermediate layer such that the inlay projects beyond an edge of the through-opening on one side, and there in an overlapping region of the inlay and of the carrier, serves as a hinge for an airbag flap formed by the surface decor and the intermediate layer with the inlay, wherein furthermore, on opening out the airbag flap, an energy amount which is dependent on the intensity of the opening impact may be absorbed by way of an at least partial release of the intermediate layer with the inlay, from the carrier, effected away from the edge in the overlapping region. Thereby, the inlay is to be understood as being encompassed by the intermediate layer.

In order in the described manner, for an energy amount dependent on the intensity of the opening impact to be able to be absorbed, a direct or indirect, and an as large surfaced as possible connection of the inlay to the carrier should be provided. Thus, it would be possible for example to bond the inlay onto the carrier in the overlapping region, possibly to fasten it only at several locations in a pointwise manner. A desired connection of the inlay to the carrier may however be realized in a particularly simple manner by way of the preferably fibrous or porous inlay at least partly, but even better completely, being designed penetrated by a foam which is encompassed by the intermediate layer and forms this at least in regions.

What is claimed is:

1. An interior trim part for covering an airbag, comprising:
   a two-dimensional carrier including a through-opening for the airbag recessed therein;
   a surface décor;
   a foam intermediate layer; and
   an inlay applied to the intermediate layer and covering the through-opening, the inlay projecting beyond an edge of the through-opening on one side to overlap a region of the carrier to form a hinge of an airbag flap formed by the surface decor and the intermediate layer with the inlay, the inlay furthermore being at least partly penetrated by the foam forming the intermediate layer so that the foam effects a connection of the inlay to the carrier, wherein a distance between the edge of the through-opening and a location up to which the intermediate layer with the inlay separates from the carrier depends on an intensity of an opening impact of the airbag so that an amount of energy absorbed by the separation varies depending on the intensity.

2. An interior trim part according to claim 1, wherein the inlay is completely penetrated by the foam forming the intermediate layer.

3. An interior trim part according to claim 1, wherein the inlay is manufactured of a thread fabric.

4. An interior trim part according to claim 1, wherein the inlay is fastened to the carrier at an end of the overlapping region which lies opposite the edge of the through-opening.

5. An interior trim part according to claim 1, wherein the inlay is one of riveted and screwed on the carrier at an end of the overlapping region which lies opposite the edge of the through-opening.

6. An interior trim part according to claim 1, wherein at least one of the inlay and the intermediate layer is weakened along the edge of the through-opening on at least one side not forming a hinge between the intermediate layer and the carrier.

7. An interior trim part according to claim 1, wherein at least one of a film and a non-woven fabric is applied behind the inlay.

8. An interior trim part according to claim 7, wherein the at least one of the film and the non-woven fabric is one of sewn and bonded to the inlay.

9. An interior trim part according to claim 1, wherein the overlapping region extends at least 4 cm past the edge of the through-opening.

10. An interior trim part according to claim 9, wherein the overlapping region extends at least 7 cm past the edge of the through-opening.

11. An interior trim part according to claim 1, wherein the trim part is one of an instrument panel and a part of an instrument panel.

12. An interior trim part according to claim 1, wherein the intermediate layer is formed of a polyurethane foam.

13. An interior trim part according to claim 1, wherein the carrier is formed of polypropylene.

14. An interior trim pan according to claim 1, wherein the carrier is reinforced on the edge of the through-opening by at least one of (i) a plastic-frame and (ii) a metal frame.

15. An airbag arrangement comprising:

an airbag; and an interior trim part covering the airbag, the interior trim part including a two-dimensional carrier including a through-opening for the airbag recessed therein, a surface décor, a foam intermediate layer and an inlay applied to the intermediate layer and covering the through-opening, the inlay projecting beyond an edge of the through-opening on one side to overlap a region of the carrier to form a hinge of an airbag flap formed by the surface decor and the intermediate layer with the inlay, the inlay furthermore being at least partly penetrated by the foam forming the intermediate layer so that the foam affects a connection of the inlay to the carrier, wherein a distance between the edge of the through-opening and a location up to which the intermediate layer with the inlay separates from the carrier depends on an intensity of an opening impact of the airbag so that an amount of energy absorbed by the separation varies depending on the intensity.

\* \* \* \* \*